(12) United States Patent
Ginsburg et al.

(10) Patent No.: US 10,429,493 B2
(45) Date of Patent: Oct. 1, 2019

(54) SOCKET DEVICE ADAPTED TO SEND, RECEIVE, AND LOOPBACK TEST SIGNALS

(71) Applicant: Texas Instruments Incorporated, Dallas, TX (US)

(72) Inventors: Brian P. Ginsburg, Allen, TX (US); Guor-Chaur Jung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 624 days.

(21) Appl. No.: 15/005,638

(22) Filed: Jan. 25, 2016

(65) Prior Publication Data

US 2016/0334503 A1 Nov. 17, 2016

Related U.S. Application Data

(60) Provisional application No. 62/160,444, filed on May 12, 2015.

(51) Int. Cl.
*G01S 7/40* (2006.01)

(52) U.S. Cl.
CPC .......... *G01S 7/4004* (2013.01); *G01S 7/4056* (2013.01)

(58) Field of Classification Search
CPC .............................. G01S 7/4004; G01S 7/4056
USPC ......................................................... 342/173
See application file for complete search history.

(56) References Cited

U.S. PATENT DOCUMENTS 6,832,075 B1 * 12/2004 Henry, Jr. .............. H04B 17/20
455/226.1

| 2002/0082792 | A1* | 6/2002 | Bourde | G01R 23/20 702/107 |
| 2003/0156295 | A1* | 8/2003 | Tan | G01M 11/331 356/477 |
| 2004/0121733 | A1* | 6/2004 | Peng | G01M 11/332 455/66.1 |
| 2007/0026809 | A1* | 2/2007 | Zhang | H04B 17/0085 455/67.11 |
| 2007/0142005 | A1* | 6/2007 | Sundstrom | H03C 5/00 455/126 |
| 2008/0114580 | A1* | 5/2008 | Chin | H04B 7/0682 703/13 |

(Continued)

FOREIGN PATENT DOCUMENTS

WO WO2015/070406 A1 * 11/2013

*Primary Examiner* — Timothy X Pham
(74) *Attorney, Agent, or Firm* — Lawrence J. Bassuk; Charles A. Brill; Frank D. Cimino

(57) ABSTRACT

A method includes: generating, via a testing signal source, a test transmission signal; receiving the test transmission signal at an input port of a socket device having the input port, an input coupler, a divider, a combiner, an output coupler and an output port; providing, via the input coupler, an input signal based on the test transmission signal; providing, via the divider, portions of the input signal to each of respective inputs of m receivers of a transceiver having n transmitters and the m receivers; combining, via the combiner, signals provided at the respective outputs of the n transmitters into a combined output signal; providing a coupled output signal to the input coupler; providing a measured output signal to the output port; providing, via the output port, the measured output signal to a receiving signal measuring device; and testing, via the receiving signal measuring device, the measured output signal.

10 Claims, 9 Drawing Sheets

(56) References Cited

U.S. PATENT DOCUMENTS

2016/0248606 A1* 8/2016 Holzmann ............. G01R 1/206
2016/0301483 A1* 10/2016 Holt .................. H04B 17/0085

* cited by examiner

SOCKET DEVICE ADAPTED TO SEND, RECEIVE, AND LOOPBACK TEST SIGNALS

The present application claims priority from: U.S. Provisional Application No. 62/160,444 filed May 12, 2015, the entire disclosure of which is incorporated herein by reference.

BACKGROUND

The present invention generally deals with testing transceivers. Conventional systems for testing transceivers will now be discussed with reference to FIGS. 1-2E.

FIG. 1 illustrates a conventional system 100 for testing a transceiver 104.

As illustrated in the figure, system 100 includes a signal generator 102, transceiver 104 and a signal tester 106. Transceiver 104 includes a receiver 108 and a transmitter 110. System 100 additionally includes communication channels 112, 114, 116, 118 and 120.

Signal generator 102 is in communication with receiver 108 by way of communication channel 112. Further, signal generator 102 is in communication with signal tester 106 by way of communication channel 120. Signal tester 106 is in communication with receiver 108 by way of communication channel 114. Further, signal tester 106 is in communication with transmitter 110 by way of communication channels 116 and 118.

Signal generator 102 may be any system or device that is able to generate a known signal to be transmitted by a receiver to test the transceiver.

Transceiver 104 may be any system or device that is able to transmit a signal and receive a signal. In cases wherein the transmitted signal is the received signal, transceiver is a repeater.

Signal tester 106 may be any system or device that is able to receive to known signal and determine if the received signal is correct and within a certain threshold of a predetermined acceptable signal.

Receiver 108 may be any system or device part of a transceiver that is able to receive or accept a signal.

Transmitter 110 may be any system or device part of the transceiver that is able to transmit a signal.

Transceiver 104 is tested with signal generator 102 and signal tester 106. Receiver 108 and transmitter 110 are tested separately.

To test receiver 108, signal generator 102 provides known test signal 122 to receiver 108 by way of communication channel 112.

Test signal 122 is a predetermined signal having predetermined parameters, such as amplitude, frequency and/or phase. Receiver 108 will have a predetermined transfer function. As such signal 138 that is output from receiver 108 should have a known correspondence to test signal 122. If signal 138 deviates from the known correspondence, then receiver 108 is not working properly.

Signal tester 106 determines whether receiver 108 is working properly. In particular, signal generator 102 provides signal 126 to signal tester 106. Signal 126 informs signal tester 106 of signal 122. In some cases signal 126 may be signal 122. Signal tester 106 has knowledge of the transfer function of receiver 108, such that signal tester 106 is able to determine the expected output signal from receiver 108 based on signal 122. Accordingly, signal tester 106 can compare signal 138 with the expected output signal from receiver 108 to determine whether receiver 108 is operating within acceptable parameters.

In some cases, if receiver 108 is not working within acceptable parameters, then transceiver 100 is discarded. In some cases, if receiver 108 is adjustable, signal tester 106 may provide an adjusting signal 128 to receiver 108 via communication channel 114. In this manner the operation of receiver 108 is adjusted. Receiver 108 may then be tested again, and adjusted if needed. This process continues until receiver 108 is operating within acceptable parameters or until a determination is made to discard transceiver 100.

To test transmitter 110, signal tester 106 provides a known test signal 136 to transmitter 110 by way of communication channel 132.

Test signal 136 is a signal having data that informs transmitter 110 to generate a specific signal. Transmitter 110 will have a predetermined transfer function. Signal 124 that is output from transmitter 110 should have a known correspondence to test signal 136. If signal 124 deviates from the known correspondence, then transmitter 108 is not working properly.

Signal tester 106 determines whether transmitter 110 is working properly. Signal tester 106 has knowledge of the transfer function of transmitter 110, such that signal tester 106 is able to determine the expected output signal from transmitter 110 based on signal 124. Accordingly, signal tester 106 can compare signal 124 with the expected output signal from transmitter 110 to determine whether transmitter 110 is operating within acceptable parameters.

In some cases, if transmitter 110 is not working within acceptable parameters, then transceiver 100 is discarded. In some cases, if transmitter 110 is adjustable, signal tester 106 may provide an adjusting signal 130 to transmitter 110 via communication channel 116. In this manner the operation of transmitter 110 is adjusted. Transmitter 110 may then be tested again, and adjusted if needed. This process continues until transmitter 110 is operating within acceptable parameters or until a determination is made to discard transceiver 100.

Another method of testing transceiver 100 deals with a loop back. In a loop back test, a signal transmitted from transmitter 110 is received by receiver 108. A loop back test is much faster than the external test discussed above. However, there are inherent problems with a loop back test. For example, there is a possibility transmitter 110 is operating in an equal yet opposite improper amount than that of receiver 108 such that the overall tested loop back seems proper.

For example, suppose that transmitter 110 transmits a signal at an amplitude that is −3 dB of the required transmission amplitude and that has a phase delay of +5° of the required transmission phase. Further, suppose that receiver 108 outputs a signal at an amplitude that is +3 dB of the expected receiving amplitude and that has a phase delay of −5° of the required receiving phase. In such a case, output signal from receiver 108 would seem to accurately correspond to the input signal of transmitter 110. However, in actuality, each of receiver 108 and transmitter 110 were working improperly.

System 100 is drawn to a single receiver and a single transmitter. However, some conventional transceivers include a receiver array and a transmitter array. For example, radar array transceivers used in the automobile industry have an array of radar transmitters and an array of radar receivers. For these types of radar transceivers, all of the receivers in the receiver array and transmitters in the transmitter array have to be tested. This will be described with additional reference to FIGS. 2A-E.

FIGS. 2A-E illustrate a conventional system 200 for testing a radar transceiver 202.

As illustrated in the figures, system 200 includes signal generator 102, radar transceiver 202 and signal tester 106. Radar transceiver 202 includes a receiver array 204 and a transmitter array 206. Receiver array 204 includes receivers 208, 210, 212 and 214. Transmitter array 206 includes transmitters 216, 218 and 220. System 200 additionally includes communication channels 112, 114, 116, 118 and 120.

Radar transceiver 202 may be any system or device that is able to send and receive a plurality of signals to/from the signal generator and the signal tester.

Receiver array 204 may be any system of device that includes a plurality of m receivers, wherein m is an integer greater than 1. In this example, receiver array 204 includes four receivers.

Transmitter array 206 may be any system or device that includes a plurality of n transmitters, wherein n is an integer greater than 1. In this example, transmitter array 206 includes three transmitters. In some cases, n may be equal to m.

Radar transceiver 202 is a frequency chirp architecture, which is the most popular of the automotive CW radars. In frequency-chirped radars, the frequency of the radar signal is varied according to a pre-determined pattern. The most widely used patterns are (a) frequency-stepped, in which frequency is changed by a step in each time period and (b) Linear Frequency Modulation (LFMCW), often referred to simply as FMCW, in which transmit frequency is changed continuously within each time period. This varying frequency essentially widens the bandwidth of the radar signal, which is equivalent to narrowing the signal in the time-domain. An FMCW radar can simultaneously estimate both the velocity and range of multiple objects.

A radar beam includes a continuous series of transmitted frequency modulated "chirps", each chirp being a short period of radar carrier transmission ramping in frequency from, for example, 77 GHz to 81 GHz. For any transmitted chirp, a plurality of reflected waves will each arrive back at radar transceiver 202 at a different time, with a different Doppler and at a different arrival angle.

An object's distance, velocity, and angle within the beam can be ascertained by analyzing the properties of their reflected waves. For chirped radar, both the velocity and distance of an object from radar transceiver 202 can be ascertained by analyzing the spectrum of the received signals. Since radar transceiver 202 has a plurality of receivers in the form of an antenna array, the angle of arrival of the reflected waves can be ascertained by analyzing the reflected wave reception across the antennas comprising the array.

To verify the accuracy of radar transceiver 202, each of receivers 208, 210, 212 and 214 in receiver array 204 and each of transmitters 216, 218 and 220 in transmitter array 206 must be calibrated or tested.

Such testing will now be described in greater detail with reference to FIGS. 2A-E. To test receiver 208, receiver 208 is tested against all transmitter within transmitter array 206. This will be described with reference to FIGS. 2A-D. For purposes of discussion, start with a test of receiver 208 using transmitter 220 of transmitter array 206. This will be described with reference to FIG. 2A.

FIG. 2A illustrates conventional system 200 for testing radar transceiver 202, wherein receiver 208 and transmitter 220 are being tested at a time $t_1$. As such, signal generator 102 is connected to receiver 208 of receiver array 204 via communication channel 112, whereas signal tester 106 is connected to transmitter 220 of transmitter array 206 via communication channel 116 and communication channel 118. Further, signal tester 106 is connected to receiver 208 via communication channel 114. Still further, signal tester 106 is connected to all the receivers within receiver array 204 via communication channel 134. Finally, signal tester 106 is additionally connected to all the transmitters within transmitter array 206 via communication channel 132.

At time $t_1$, to test receiver 208, signal generator 102 provides a known test signal 122 to receiver 208 by way of communication channel 112.

Test signal 122 is a predetermined signal having predetermined parameters, such as amplitude, frequency and/or phase. Receiver 208 will have a predetermined transfer function. As such, signal 138 that is output from receiver 208 should have a known correspondence to test signal 122. If signal 138 deviates from the known correspondence, then receiver 208 is not working properly.

Signal tester 106 determines whether receiver 308 is working properly. In particular, signal generator 102 provides signal 126 to signal tester 106. Signal 126 informs signal tester 106 of signal 122. In some cases, signal 126 may be signal 122. Signal tester 106 has knowledge of the transfer function of receiver 208, such that signal tester 106 is able to determine the expected output signal from receiver 208 based on signal 122. Accordingly, signal tester 106 can compare signal 138 with the expected output signal from receiver 208 to determine whether receiver 208 is operating within acceptable parameters.

In some cases, if receiver 208 is not working within acceptable parameters, then transceiver 200 is discarded. In some cases, if receiver 208 is adjustable, signal tester 106 may provide an adjusting signal 128 to receiver 208 via communication channel 114. In this manner the operation of receiver 208 is adjusted. Receiver 208 may then be tested again, and adjusted if needed. This process continues until receiver 208 is operating within acceptable parameters or until a determination is made to discard transceiver 200.

To test transmitter 220, signal tester 106 provides a known test signal 136 to transmitter 110 by way of communication channel 132.

Test signal 136 is a signal having data that informs transmitter 220 to generate a specific signal. Transmitter 220 will have a predetermined transfer function. Signal 124 that is output from transmitter 220 should have a known correspondence to test signal 136. If signal 124 deviates from the known correspondence, then transmitter 220 is not working properly.

Signal tester 106 determines whether transmitter 220 is working properly. Signal tester 106 has knowledge of the transfer function of transmitter 220, such that signal tester 106 is able to determine the expected output signal from transmitter 220 based on signal 124. Accordingly, signal tester 106 can compare signal 124 with the expected output signal from transmitter 220 to determine whether transmitter 220 is operating within acceptable parameters.

In some cases, if transmitter 220 is not working within acceptable parameters, then transceiver 200 is discarded. In some cases, if transmitter 220 is adjustable, signal tester 106 may provide an adjusting signal 130 to transmitter 220 via communication channel 116. In this manner the operation of transmitter 220 is adjusted. Transmitter 220 may then be tested again, and adjusted if needed. This process continues until transmitter 220 is operating within acceptable parameters or until a determination is made to discard transceiver 200.

After receiver 208 is tested, then receiver 210 may be tested in the same manner. This will be described in greater detail with reference to FIG. 2B. FIG. 2B illustrates conventional system 200 for testing radar transceiver 202, wherein receiver 210 and transmitter 220 are being tested at a time $t_2$.

In operation, first of all, receiver 208 must be disconnected to communication channels 112 and 114. Then receiver 210 is connected to communication channels 112 and 114.

To test receiver 210, signal generator 102 provides a known test signal 222 to receiver 210 by way of communication channel 112.

Test signal 222 is a predetermined signal having predetermined parameters, such as amplitude, frequency and/or phase. Receiver 210 will have a predetermined transfer function. As such, signal 138 that is output from receiver 210 should have a known correspondence to test signal 222. If signal 138 deviates from the known correspondence, then receiver 210 is not working properly.

Signal tester 106 determines whether receiver 210 is working properly. In particular, signal generator 102 provides signal 126 to signal tester 106. Signal 126 informs signal tester 106 of signal 222. In some cases, signal 126 may be signal 222. Signal tester 106 has knowledge of the transfer function of receives 210, such that signal tester 106 is able to determine the expected output signal from receiver 210 based on signal 222. Accordingly, signal tester 106 can compare signal 138 with the expected output signal from receiver 210 to determine whether receiver 210 is operating within acceptable parameters.

In some cases, if receiver 210 is not working within acceptable parameters, then transceiver 200 is discarded. In some cases, if receiver 210 is adjustable, signal tester 106 may provide an adjusting signal 226 to receiver 210 via communication channel 114. In this manner the operation of receiver 210 is adjusted. Receiver 210 may then be tested again, and adjusted if needed. This process continues until receiver 210 is operating within acceptable parameters or until a determination is made to discard transceiver 200.

To test transmitter 220, signal tester 106 provides a known test signal 136 to transmitter 110 by way of communication channel 132.

Test signal 136 is a signal having data that informs transmitter 220 to generate a specific signal. Transmitter 220 will have a predetermined transfer function. Signal 224 that is output from transmitter 220 should have a known correspondence to test signal 136. If signal 224 deviates from the known correspondence, then transmitter 220 is not working properly.

Signal tester 106 determines whether transmitter 220 is working properly. Signal tester 106 has knowledge of the transfer function of transmitter 220, such that signal tester 106 is able to determine the expected output signal from transmitter 220 based on signal 224. Accordingly, signal tester 106 can compare signal 224 with the expected output signal from transmitter 220 to determine whether transmitter 220 is operating within acceptable parameters.

In some cases, if transmitter 220 is not working within acceptable parameters, then transceiver 200 is discarded. In some cases, if transmitter 220 is adjustable, signal tester 106 may provide an adjusting signal 228 to transmitter 220 via communication channel 116. In this manner the operation of transmitter 220 is adjusted. Transmitter 220 may then be tested again, and adjusted if needed. This process continues until transmitter 220 is operating within acceptable parameters or until a determination is made to discard transceiver 200.

After receiver 210 is tested, then receiver 212 may be tested in the same manner. FIG. 2C illustrates conventional system 200 for testing radar transceiver 202, wherein receiver 212 and transmitter 220 are being tested at a time $t_3$.

In operation, first of all, receiver 210 must be disconnected to communication channels 112 and 114. Then receiver 212 is connected to communication channels 112 and 114.

The testing is similar to that discussed above with reference to FIGS. 2A-B. However, when testing receiver 212 signal tester 106 compares signal 138 with a test signal 230, wherein receiver 212 may be adjusted via adjusting signal 234. Further, when testing transmitter 220, signal tester 106 compares signal 232 with test signal 136, wherein transmitter 220 may be adjusted via adjusting signal 236.

After receiver 212 is tested, then receiver 214 may be tested in the same manner. FIG. 2D illustrates conventional system 200 for testing radar transceiver 202, wherein receiver 214 and transmitter 220 are being tested at a time $t_4$.

In operation, first of all, receiver 212 must be disconnected to communication channels 112 and 114. Then receiver 214 is connected to communication channels 112 and 114.

The testing is similar to that discussed above with reference to FIGS. 2A-C. However, when testing receiver 214 signal tester 106 compares signal 138 with a test signal 238, wherein receiver 214 may be adjusted via adjusting signal 242. Further, when testing transmitter 220, signal tester 106 compares signal 240 with test signal 136, wherein transmitter 220 may be adjusted via adjusting signal 244.

Now that transmitter 220 and all receivers within receiver array 204 have been tested, the remaining transmitters within transmitter array 206 and the same receivers within receiver array 204 additionally need to be tested. For example, FIG. 2E shows transmitter 218 and receiver 208 being tested at a time $t_5$.

In operation, first of all, receiver 208 must be again connected to communication channels 112 and 114. Further, transmitter 220 must be disconnected to communication channels 116 and 118. Then transmitter 218 is connected to communication channels 116 and 118.

The testing is similar to that discussed above with reference to FIG. 2A. However, when testing transmitter 208 signal tester 106 compares signal 138 with a test signal 246, wherein receiver 208 may be adjusted via adjusting signal 250. Further, when testing transmitter 218, signal tester 106 compares signal 248 with test signal 136, wherein transmitter 218 may be adjusted via adjusting signal 252.

The remaining receivers within receiver array 204 and transmitter 218 are then tested, commensurate with the multiple connecting/disconnecting when required. Then transmitter 216 and the same receivers within receiver array 204 are then tested in a similar manner.

Transceiver 200 can also be tested in a loop back method. Again however, inherent problems with a loop back test as discussed above with reference to transceiver 100 would be present in the test of transceiver 200 also. Further, the multiple connection/disconnections would still need to be performed to test all transmitters and receivers in transceiver 200.

Accordingly, for at least the foregoing reasons there exists a need for a system and method to efficiently and accurately test a transceiver having a transmitter array and receiver array.

SUMMARY

The present invention provides a system and method to efficiently and accurately test a transceiver having a transmitter array and receiver array.

An aspect of the present invention is drawn to a system and method for testing a transceiver. The method includes: generating, via a testing signal source, a test transmission signal; receiving the test transmission signal at an input port of a socket device having the input port, an input coupler, a divider, a combiner, an output coupler and an output port; providing, via the input coupler, an input signal based on the test transmission signal; providing, via the divider, portions of the input signal to each of respective inputs of m receivers of a transceiver having n transmitters and the m receivers, n being an integer greater than one and m being an integer greater than one, each of the n transmitters having a respective transmitter input and a respective transmitter output, each of the m receivers having the respective receiver input and a respective receiver output; combining, via the combiner, signals provided at the respective outputs of the n transmitters into a combined output signal; providing, via the output coupler and based on the combined output signal, a coupled output signal to the input coupler; providing, via the output coupler and based on the combined output signal and the coupled output signal, a measured output signal to the output port; providing, via the output port, the measured output signal to a receiving signal measuring device; and testing, via the receiving signal measuring device, the measured output signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the present invention are drawn to a system and method for testing a transceiver having a receiver array and a transmitter array.

Aspects of the present invention include a socket device, which is disposed between a transmitter array of a transceiver and a receiver array of the transceiver. The socket device includes a power combiner, a power divider, an input coupler, a loopback line and output coupler. The socket device enables the transmitter array and the receiver array each be easily tested by way of an external testing mode or by way of a loopback mode.

In the external testing mode, the input coupler connects an external signal generator to the power divider and receiver array and the output coupler connects the power combiner and transmitter array to an external signal tester. In an example embodiment, the external test equipment provides a test signal to the receiver array. The power divider splits the test transmission signal such that it is received by all the receivers of the receiver array. Further, the power combiner combines the outputs of the transmitters of the transmitter array. The signal transmitted from the transmitter array then travels through the output coupler to be measured by the external signal tester.

In the loopback testing mode, signals generated by the transmitter array are used to test the receiver array. In the loopback testing mode, an output from the transmitter array is provided to the output coupler. The output coupler transmits the signal from the transmitter array to the input coupler by way of the loopback line. The input coupler then provides the signal from the loopback line to the power divider and receiver array.

Example embodiments in accordance with aspects of the present invention will now be described with reference to FIGS. 3A-B.

Figure 1:
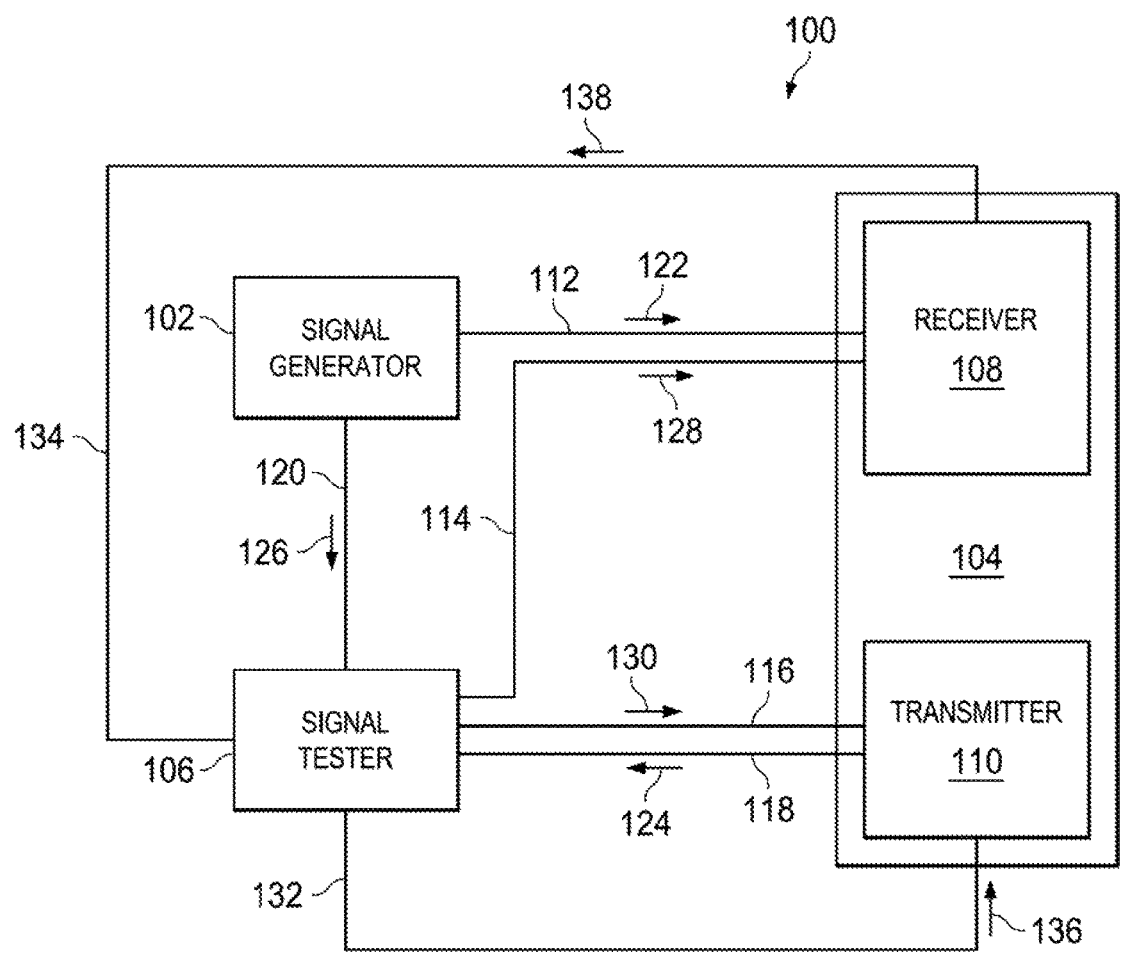
FIG. 1 illustrates a conventional system for testing a transceiver.
Figure 2A:
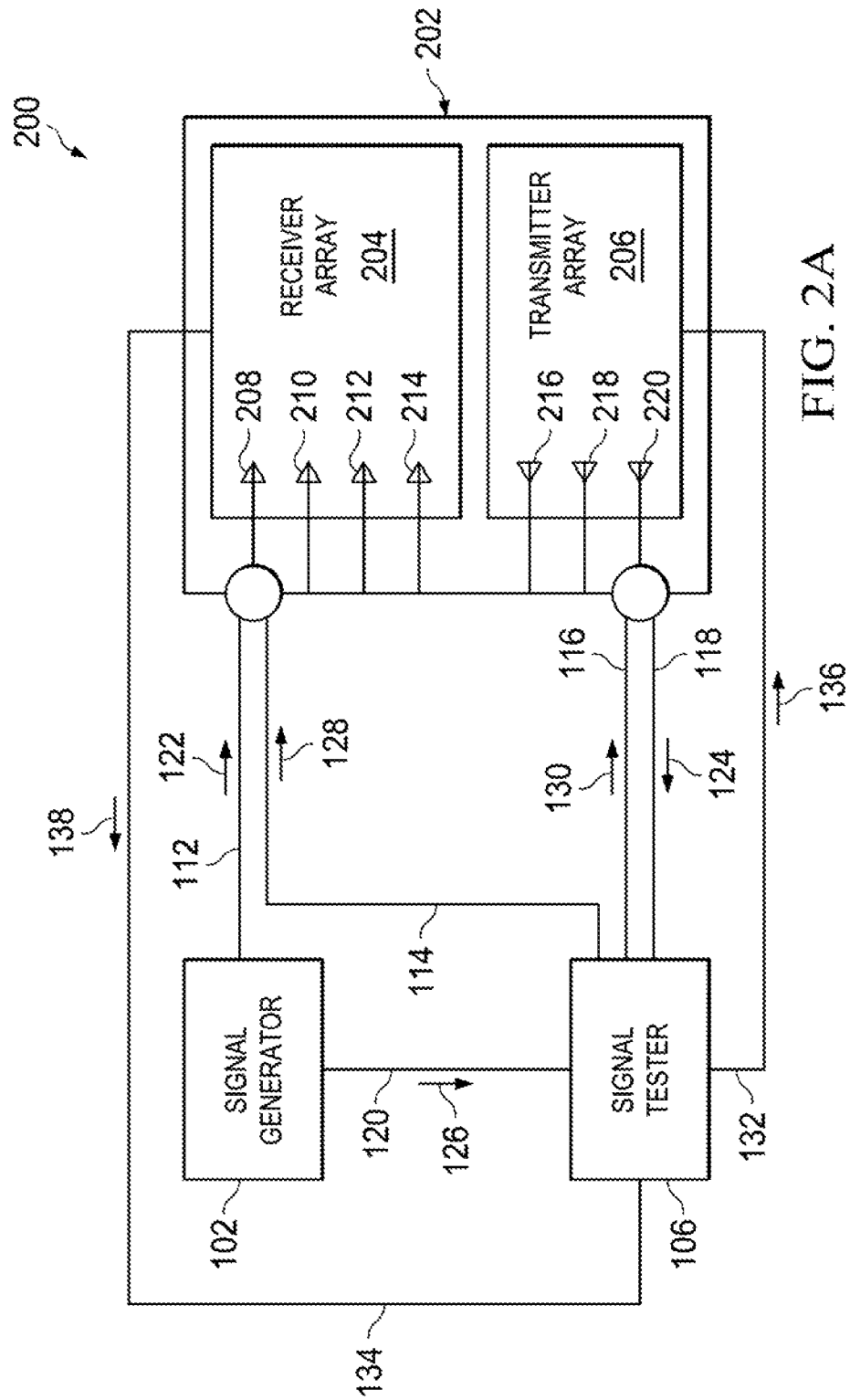
FIG. 2A illustrates a conventional system for testing a radar transceiver at a time $t_1$.
Figure 2B:
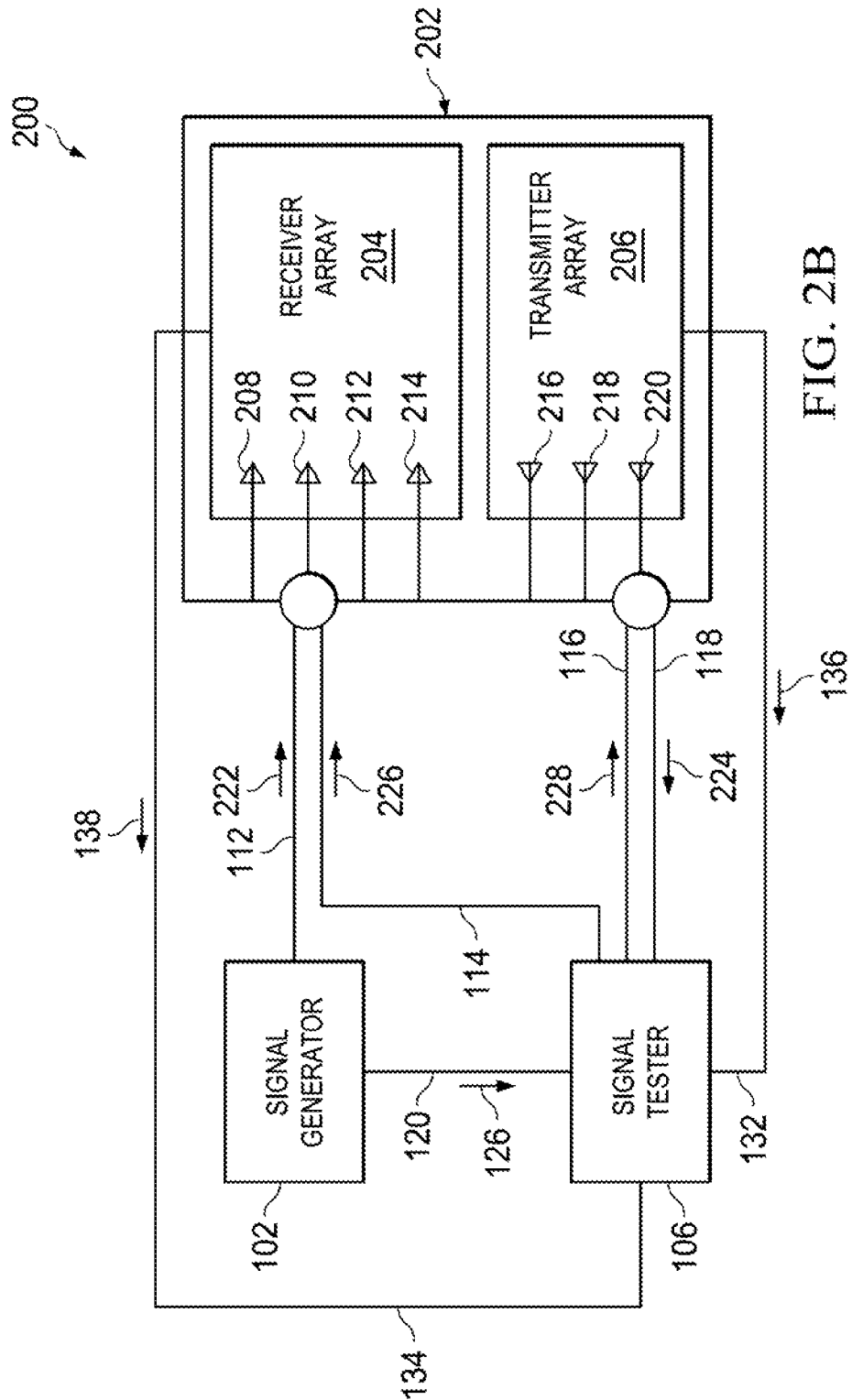
FIG. 2B illustrates conventional system for testing a radar transceiver of FIG. 2A, but at a time $t_2$.
Figure 2C:
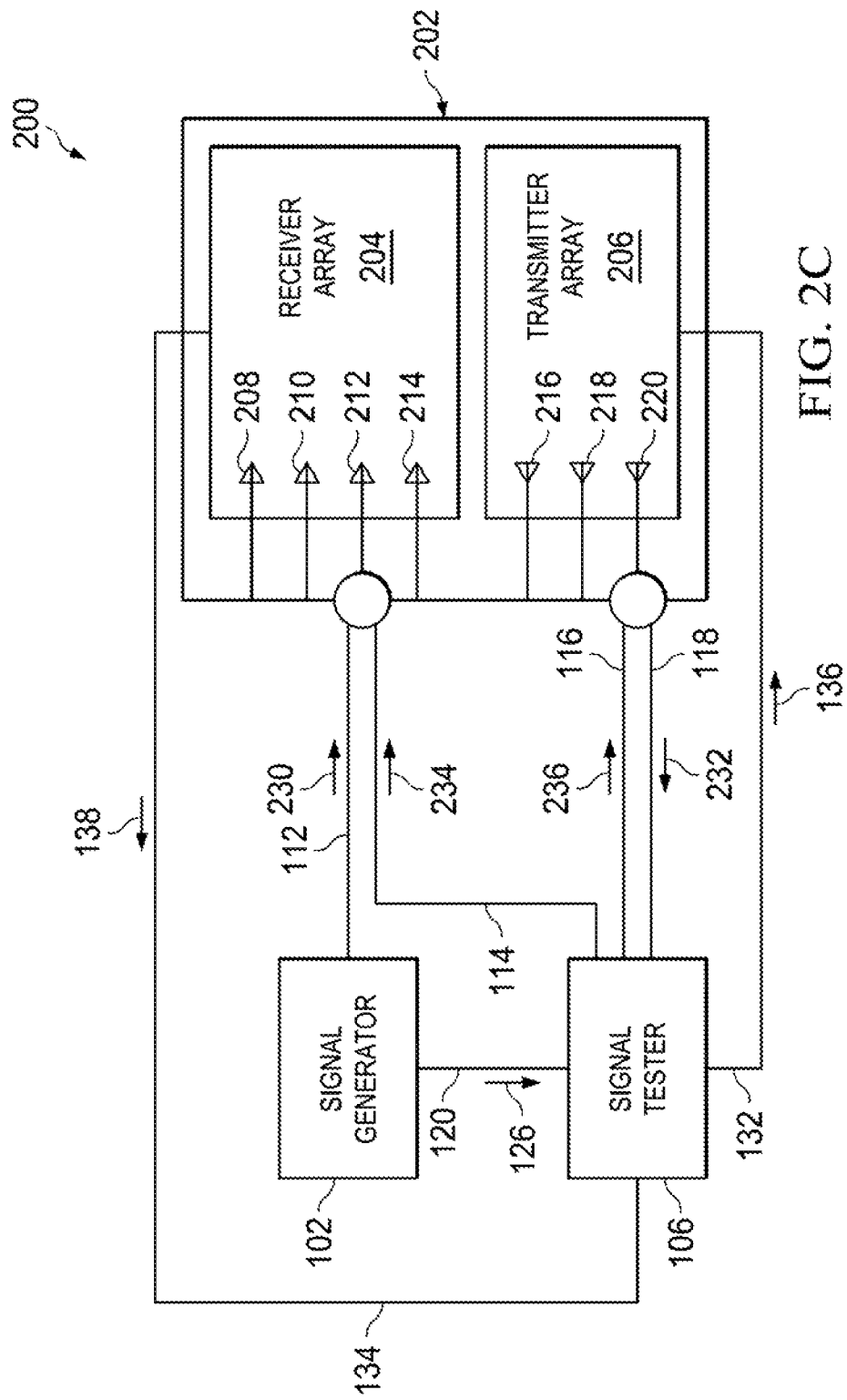
FIG. 2C illustrates conventional system for testing a radar transceiver of FIG. 2A, but at a time $t_3$.
Figure 2D:
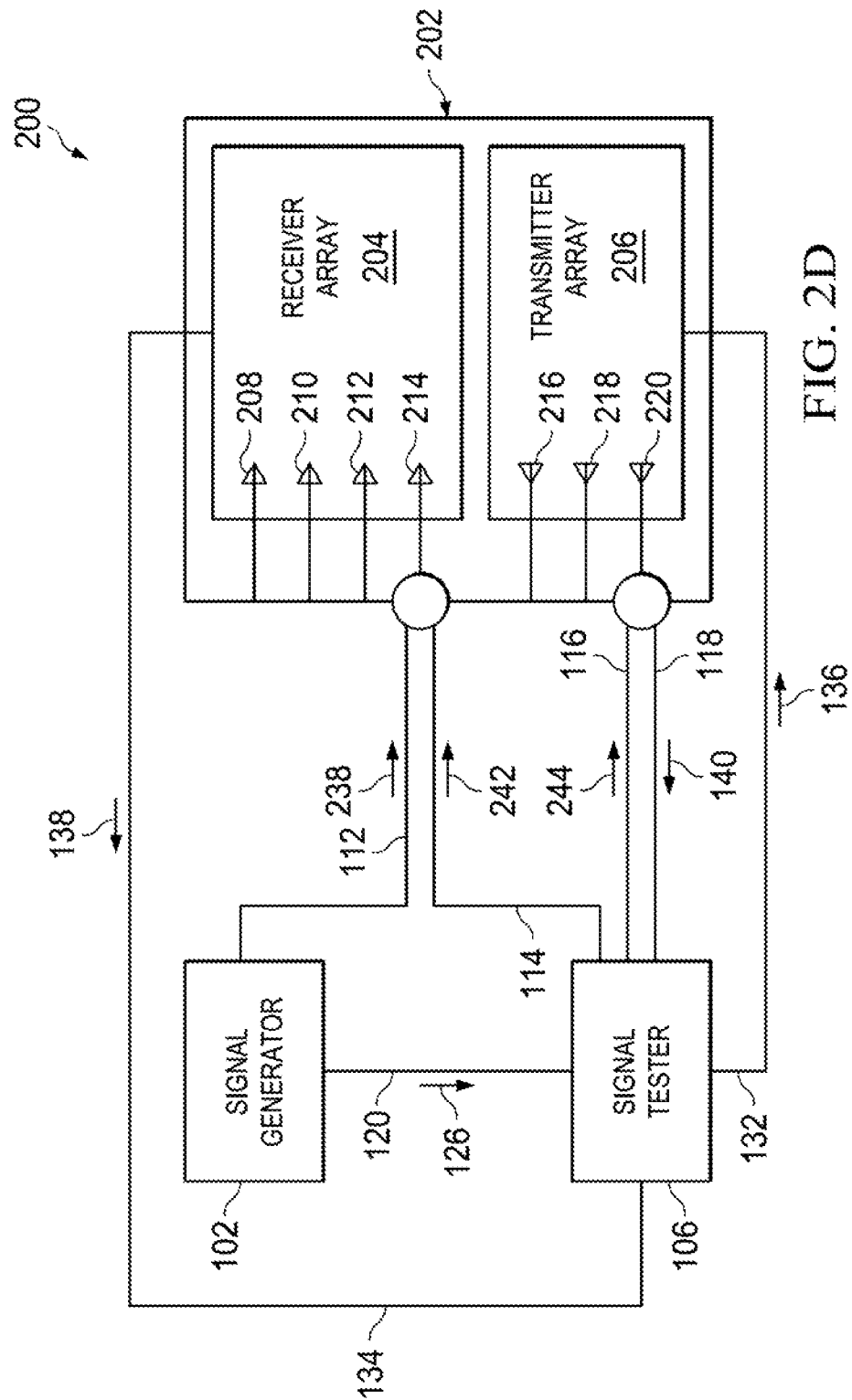
FIG. 2D illustrates conventional system for testing a radar transceiver of FIG. 2A, but at a time $t_4$.
Figure 2E:
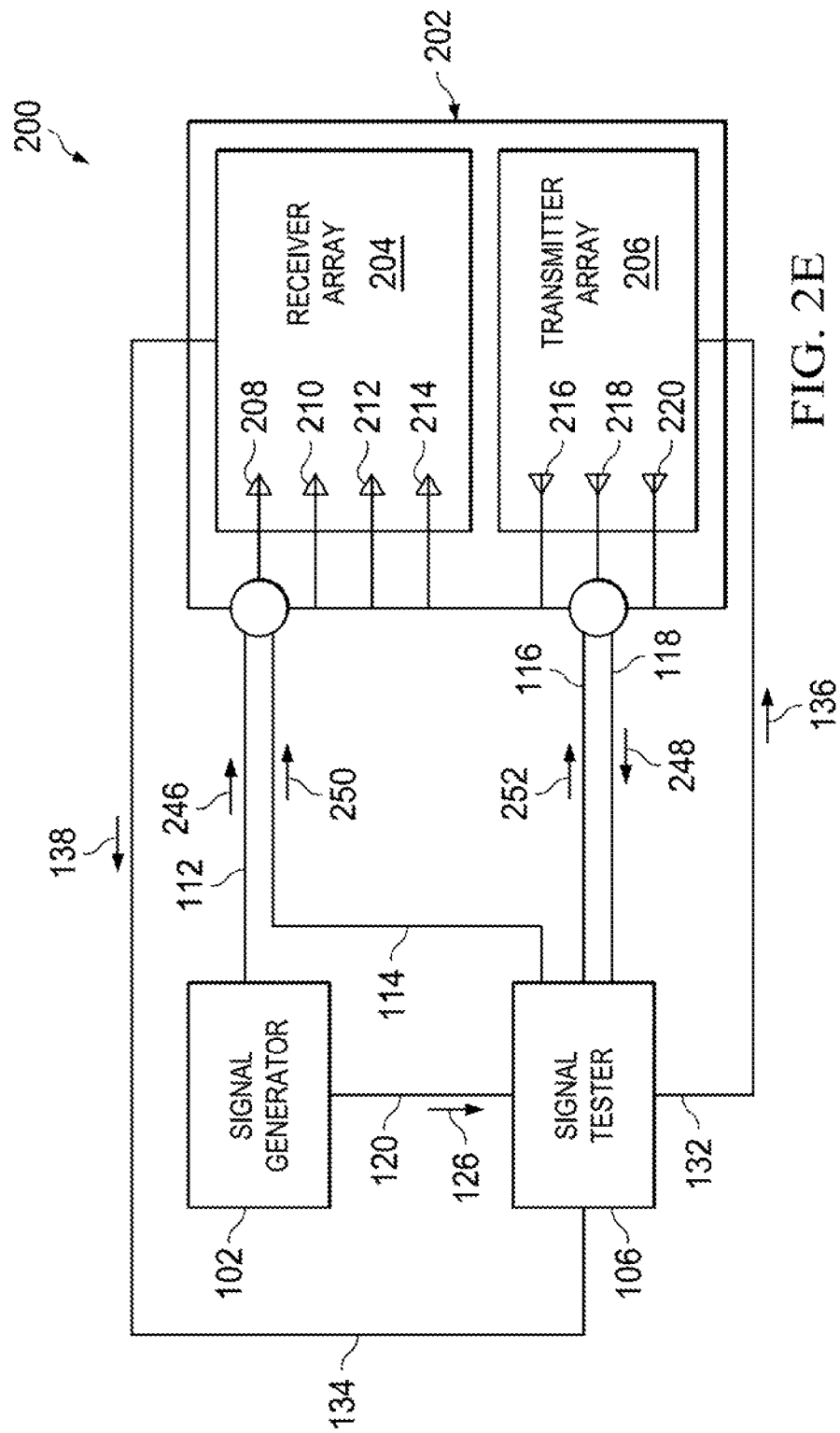
FIG. 2E illustrates conventional system for testing a radar transceiver of FIG. 2A, but at a time $t_5$.
Figure 3A:
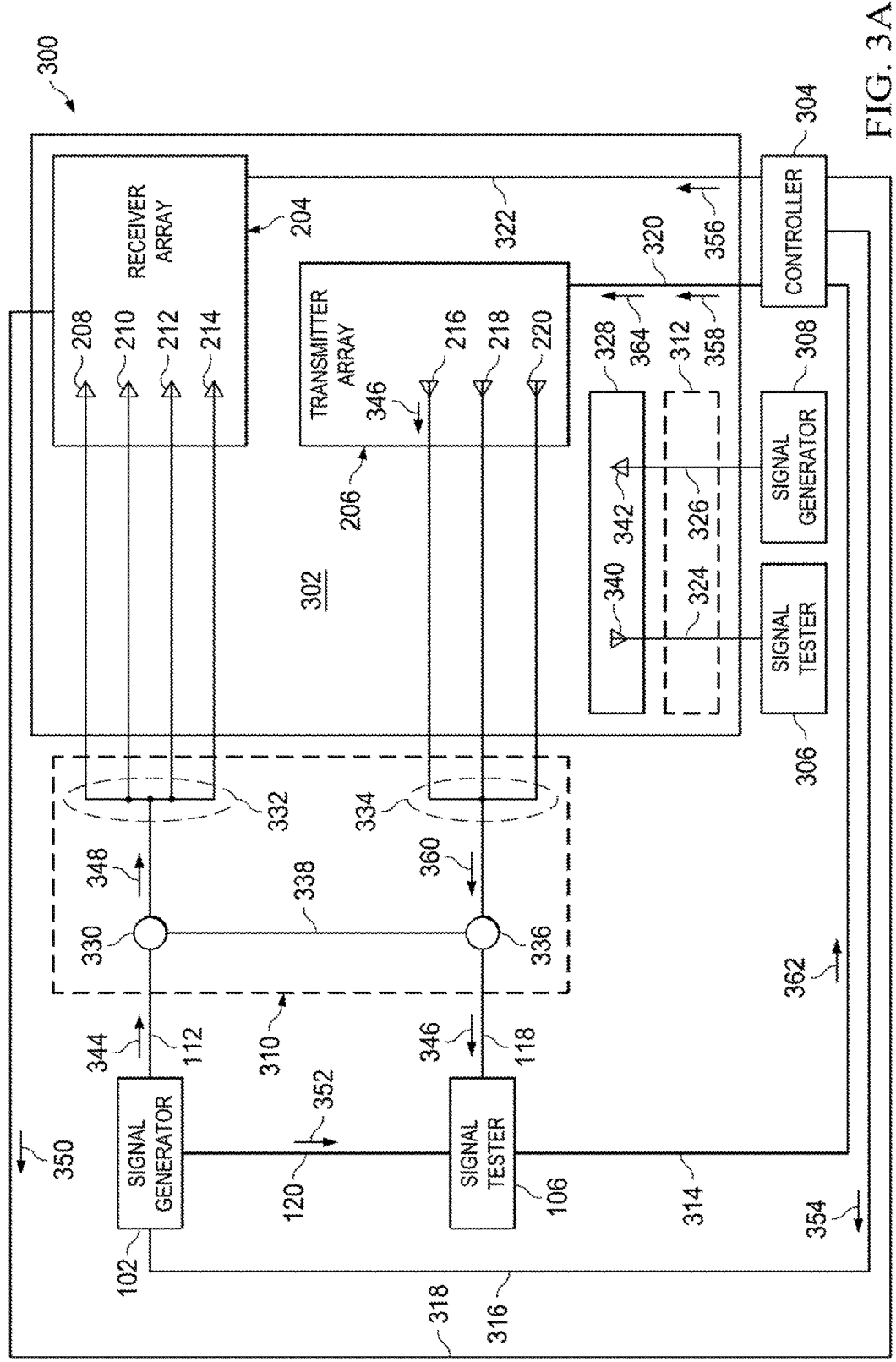
FIG. 3A illustrates a system for testing a transceiver in an external testing mode in accordance with aspects of the present invention.
Figure 3B:
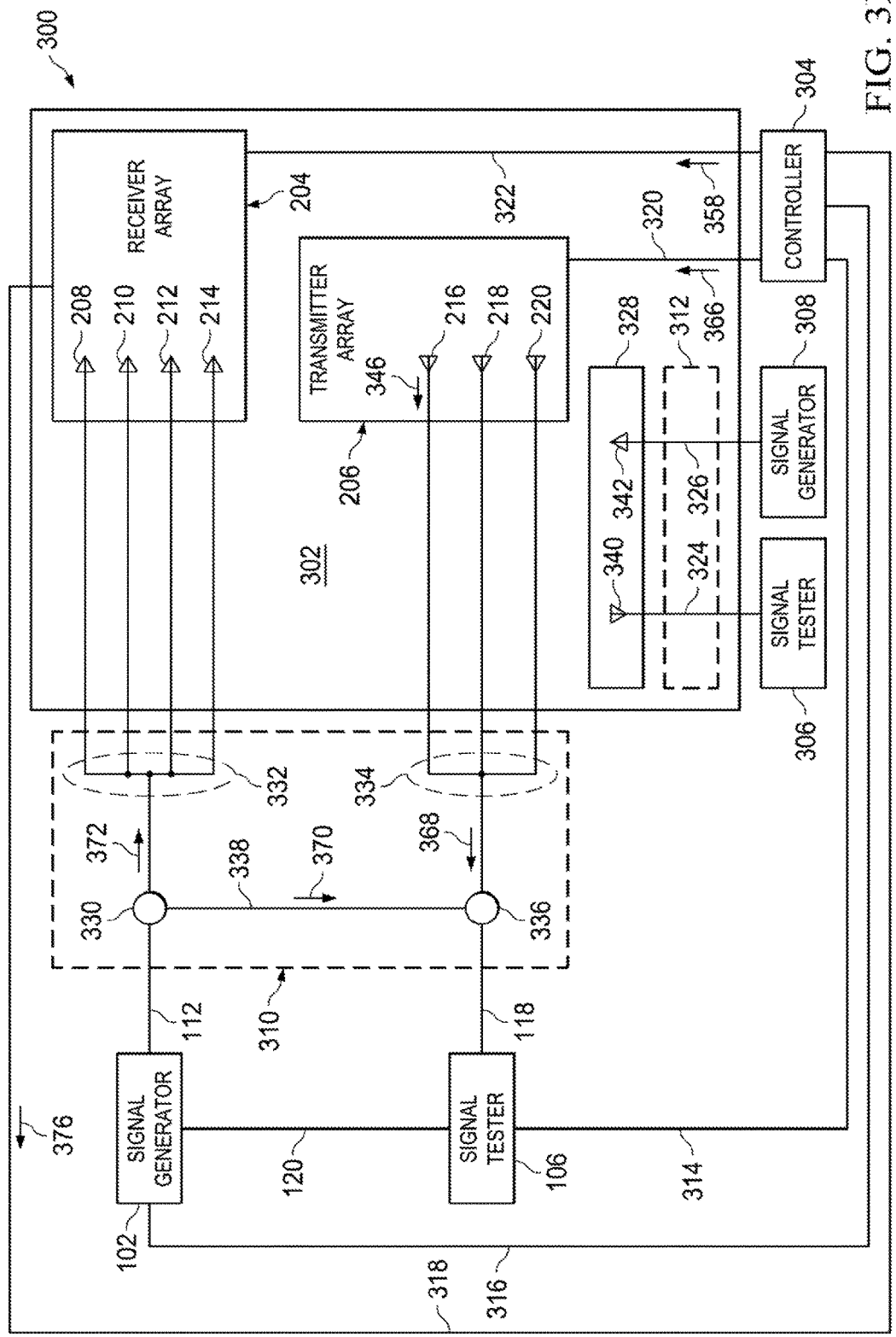
FIG. 3B illustrates a system for testing a transceiver in a loopback testing mode in accordance with aspects of the present invention.

FIGS. 3A-B illustrate a system 300 for testing a transceiver 302 in accordance with aspects of the present invention.

As illustrated in the figures, system 300 includes signal generator 102, signal tester 106, a controller 304, a signal tester 306, a signal generator 308, a socket device 310, a socket device 312, communication channel 112, communication channel 118, communication channel 120, a communication channel 314, communication channel 316, a communication channel 318, a communication channel 320, a communication channel 322, a communication channel 324 and a communication channel 326.

Transceiver 302 includes receiver array 204, transmitter array 206, and a transceiver portion 328.

Socket device 310 includes an input coupler 330, a power divider 332, a power combiner 334, an output coupler 336 and a loopback line 338. Socket device 312 additionally includes an input coupler (not shown), an output coupler (not shown) and a loopback line (not shown).

Transceiver portion 328 includes a transmitter 340 and a receiver 342. Transceiver 302 may be any system or device that is able to send and receive a plurality of signals to/from the signal generator and the signal tester.

Controller 304 may be any system or device that is able to selectively control transmitters 216, 218 and 220 of transmitter array 206.

Signal generator 308 may be any system or device that is able to generate a known signal to be transmitted by a receiver for the testing of a transceiver, to assure the transceiver operates correctly.

Signal tester 306 may be any system or device that is able to receive a known signal and determine if the received signal is correct and within a certain threshold of a predetermined acceptable signal.

FIG. 3A illustrates the external testing mode of system 300 in accordance with aspects of the present invention.

As illustrated in FIG. 3A signal generator 102 provides a known test transmission signal 344 to receiver array 204 by way of communication channel 112, and signal tester 106 tests a measured output signal 346 from transmitter array 206 by way of communication channel 118.

As shown in the figure, signal generator 102 tests receiver array 204, whereas signal tester 106 tests transmitter array 206. During the external testing mode, test transmission signal 344 is sent from signal generator 102 and passes through input coupler 330.

In the external testing mode, input coupler 330 couples test transmission signal 344 to generate input signal 348. Input coupler 330 has a predetermined transfer function, such that input signal 348 will have a predetermined functional relationship to test transmission signal 344 with respects to predetermined parameters, non-limiting examples of which include amplitude, phase, frequency and combinations thereof. In some example embodiments, the functional relationship to test transmission signal 344 can be determined by calibration procedures.

Input signal 348 is then provided to receiver array 204 by way of power divider 332. Power divider 332 splits input signal 348 to all receivers of receiver array 204. In some embodiments, power divider 332 equally splits input signal 348 to all receivers of receiver array 204. In other embodiments, power divider 332 unevenly splits signal 348 in accordance with predetermined parameters. For purposes of discussion therein, in an example embodiment, power divider 332 equally splits input signal 348 to all receivers of receiver array 204.

Each receiver in receiver array 204 will then output a received signal based on the portion of input signal 348, for which it receives. Each receiver will have a predetermined transfer function, such that the output signal will have a predetermined functional relationship to the input signal with respects to predetermined parameters, non-limiting examples of which include amplitude, phase, frequency and combinations thereof.

These output signals from the individual receivers are transmitted to controller 304 as a feedback signal 350 by way of communication channel 318, Feedback signal 350 provides information to controller 304 to assure the receivers on receiver array 204 are operating correctly based on test transmission signal 344 generated from signal generator 102. In some example embodiments, receiver array 204 outputs are internally verified to function and sent to controller 304. Further, in some example embodiments, output signals from receiver array 204 can be sent to signal tester 106 as an analog signal to verify its quality.

Signal generator 102 sends signal 352 to signal tester 106 by way of communication channel 120. Signal 352 includes information to inform signal tester 106 of test transmission signal 344 as provided to receiver array 204.

Controller 304 also sends a signal 354 to signal generator 102 via communication channel 316. Signal 354 instructs signal generator 102 to transmit test transmission signal 344 to receiver array 204.

During the test sequence, signal 354 instructs signal generator 102 to transmit signal 344 for testing receivers 208, 210, 212 and 214 of receiver array 204. The transfer function of each of input coupler 330 and power coupler 332 are known, such that the signals received by each are receivers 208, 210, 212 and 214 are known. Further, the transfer function of each of receivers 208, 210, 212 and 214 are anticipated.

The expected output signal from each of receivers 208, 210, 212 and 214 that correspond to signal 354 is based on the known transfer function of each of input coupler 330 and power divider 332 and the anticipated transfer function of each of receivers 208, 210, 212 and 214. In an example embodiment, these expected output signals from receivers 208, 210, 212 and 214 are stored in controller 304.

In this manner, the actual output signal from each of receivers 208, 210, 212 and 214 are provided to controller 304 as feedback signal 350. In some embodiments, feedback signal 350 comprises a serial composition of an output signal from each of receivers 208, 210, 212 and 214. In some embodiments, feedback signal 350 is an encoded combination of the output signal from each of receivers 208, 210, 212 and 214. Any known method of transmitting the output signals from each of receivers 208, 210, 212 and 214 to controller 304 may be implemented, so long as controller 304 is able to distinguish which output signal corresponds to which of receivers 208, 210, 212 and 214. In one non-limiting, example method of transmitting the output signals from each of receivers 208, 210, 212 and 214 to controller 304, communication channel 318 provides a parallel combination of four signals, each of which corresponds to a respective one of receivers 208, 210, 212 and 214.

Controller 304 then compares the actual output signals from each of receivers 208, 210, 212 and 214 with the corresponding expected output signals for each of receivers 208, 210, 212 and 214. If the actual output signal for any of receivers 208, 210, 212 and 214 does not coincide with the expected output signal within a predetermined threshold, then the receiver(s) in question is (or are) not performing correctly.

In some embodiments, if any one of receivers 208, 210, 212 and 214 is not performing correctly, the incorrectly performing receiver(s) may be replaced, receiver array 204 may be replaced or device 300 may be replaced.

In other embodiments, the incorrectly performing receiver(s) may be adjusted to correct the ill performance. For example, controller 304 may provide an adjustment signal 356, via communication channel 322, to receiver array 204 to adjust performance of the incorrectly performing receiver(s). After the ill performing receiver is adjusted, the testing is again performed. Again, if the adjusted receiver is still not performing correctly, the incorrectly performing receiver(s) may be replaced, receiver array 204 may be replaced or device 300 may be replaced. Alternatively, the ill performing receiver may again be adjusted by controller 304.

Now that receivers 208, 210, 212 and 214 have been tested, transmitters 216, 218 and 220 may be tested.

In an example external testing mode, controller 304 sends a control signal 358 via communication channel 312 to transmitter array 206, to serially enable each transmitter of transmitter array 206. Control signal 358 not only enables a specific transmitter in transmitter array 206, but control signal 358 additionally instructs the specifically enabled transmitter as to what signal to transmit. In particular, control signal 358 provides information related to parameters of the signal to be transmitted, non-limiting examples of such parameters include amplitude, frequency, phase, duration, etc.

The output of each transmitter of transmitter array 206 is provided to power combiner 334. Power combiner 334 combines the outputs from transmitters 216, 218 and 220. However, only one of transmitter 216, 218 and 220 from transmitter array 206 is activated at a single time.

Power combiner 334 then sends out a combined output signal 360 to output coupler 336. Output coupler 336 has a known transfer function such that measured output signal 346 will have a predetermined functional relationship to combined output signal 360 with respect to predetermined parameters, non-limiting examples of which include amplitude, phase, frequency and combinations thereof.

For purposes of discussion signal tester 106 then sends measured output signal 346 to controller 304 via communication channel 314.

During the test sequence, control signal 358 instructs transmitter 216 to transmit a known signal, which is output from power combiner 334 as combined output signal 360. The transfer function of power combiner 334 and output coupler 336 are known. Further, the transfer function of transmitter 216 is anticipated.

The expected measured output signal 346 corresponding to a signal from transmitter 216 is based on the known transfer function of each of power combiner 334 and output coupler 336 and the anticipated transfer function of each of transmitter 216. In an example embodiment, this expected measured output signal is stored in controller 304.

In this manner, the actual measured output signal is provided to controller 304 as signal 362. Controller 304 then compares the actual measured output signal corresponding to the signal transmitted from transmitter 216 with the corresponding expected measured output signal corresponding to the signal transmitted from transmitter 216. If the actual measured output signal does not coincide with the expected measured output signal within a predetermined threshold, then transmitter 216 not performing correctly.

In some embodiments, if transmitter 216 is not performing correctly, transmitter 216 may be replaced, transmitter array 206 may be replaced or device 300 may be replaced.

In other embodiments, transmitter 216 may be adjusted to correct the ill performance. For example, controller 304 may provide an adjustment signal 364 to transmitter array 206 to adjust performance of transmitter 216. After the ill performing transmitter is adjusted, the testing is again performed. Again, if adjusted transmitter 216 is still not performing correctly, adjusted transmitter 216 may be replaced, transmitter array 206 may be replaced or device 300 may be replaced. Alternatively, the ill performing adjusted transmitter 216 may again be adjusted by controller 304.

The remaining transmitters of transmitter array 206 are then similarly tested.

Similar testing occurs for transceiver portion 328. For purposes of discussion, it is a single transmitter and a single receiver that enables an external system to easily test transceiver portion 328.

The external testing mode as discussed above with reference to FIG. 3A very accurately tests each receiver in receiver array 204 and each transmitter in transmitter array 206. However, the trade-off for accuracy is time, wherein extended time is needed to test, in parallel, all the receivers in receiver array 204 and then serially test all the transmitters in transmitter array 206. In accordance with another aspect of the present invention, a loopback testing mode provides a much faster testing time, but at a cost of less accuracy for certain specifications.

For instance, the absolute output power may be better determined by signal tester 106, as discussed above with respect to a receiver compensating, for transmitter impairments. The relative phase balance of transmitters 216, 218 and 220, however, may actually be better measured via a loopback testing method. This is primarily due to the difficulty of maintaining coherence between transceiver 302 and signal tester 106 during a test. In a loopback testing method, the coherence is guaranteed by a single clock source inside transceiver 302.

This will be described in greater detail with reference to FIG. 3B.

FIG. 3B illustrates an example loopback testing mode of system 300 in accordance with aspects of the present invention.

In the loopback testing mode, input coupler 330 of socket device 310 is used to couple an output signal from transmitter array 206 to receiver array 204. In this mode, there is no use of signal generator 102 or signal tester 106.

Controller 304 sends control signal 366 to transmitter array 206, to serially enable each transmitter of transmitter array 206. The output of each transmitter of transmitter array 206 is provided to power combiner 334. Power combiner 334 the sends out a combined output signal 368 to output coupler 336.

In a loopback testing mode, output coupler 336 couples combined output signal 368 to loopback line 338 as a coupled output signal 370. As mentioned earlier, output coupler 336 has a known transfer function, wherein coupled output signal 370 will have a predetermined functional relationship to combined output signal 368 with respect to predetermined parameters, non-limiting examples of which include amplitude, phase, frequency and combinations thereof.

Coupled output signal 370 is provided to input coupler 330 via loopback line 338. Input coupler 330 then provides coupled output signal 370 to power divider 332 as signal 372. As mentioned earlier, input coupler 330 has a known transfer function, wherein signal 372 will have a predetermined functional relationship to coupled output signal 370 with respect to predetermined parameters, non-limiting, examples of which include amplitude, phase, frequency and combinations thereof. In a similar manner as discussed above in FIG. 3A, power divider 332 splits signal 372 to all receivers of receiver array 204.

During the test sequence, the transfer function of each of power combiner 334, output coupler 336, input coupler 330 and power divider 332 are known. In some embodiments, these transfer functions can be determined as part of a test hardware calibration procedure. Further, the transfer function of each of transmitters 216, 218, and 220 and receivers 208, 210, 212 and 214 are anticipated.

In an example loopback testing mode, controller 304 sends control signal 366 via communication channel 320 to transmitter array 206, to serially enable each transmitter of transmitter array 206. Control signal 366 not only enables a specific transmitter in transmitter array 206, but control signal 366 additionally instructs the specifically enabled transmitter as to what signal to transmit. In particular, control signal provides information related to parameters of the signal to be transmitted, non-limiting examples of such parameters include amplitude, frequency, phase, duration, etc.

For purposes of brevity, consider the ease where transmitter 216 is tested, along with all the receivers in receiver array 204. In such a case, the transfer function of transmitter 216 and receivers 208, 210, 212 and 214 are anticipated. As mentioned previously, each transmitter in transmitter array 206 will have a known and expected transfer function, if it is operating correctly.

As such, a signal 374 provided to power combiner 334 from transmitter 216 should have an expected functional relationship to the signal that transmitter 216 transmits, based on control signal 366 and based on the known transfer function of transmitter 216. Similarly, combined output signal 368 should have a known functional relationship to signal 374, based on the known transfer function of power combiner 334.

Coupled output signal 370 should have a known functional relationship to combined output signal 368, based on the known transfer function of output coupler 336. Further, signal 372 should have a known functional relationship to coupled output signal 370, based on the known transfer function of input coupler 330. Still further, the signal received each of receivers 208, 210, 212 and 214 should have a known functional relationship to signal 372, based on the known transfer function of power divider 332.

The expected output signal from each of receivers 208, 210, 212 and 214 that correspond to control signal 366 is based on the known transfer function of each of power combiner 334, output coupler 336, input coupler 330 and power coupler 332 and the anticipated transfer function of each of transmitter 216 and receivers 208, 210, 212 and 214. In an example embodiment, these expected output signals from receivers 208, 210, 212 and 214 are stored in controller 304.

In this manner, the actual output signal from each of receivers 208, 210, 212 and 214 are provided to controller 304 as a signal 376. In some embodiments, signal 376 comprises a serial composition of an output signal from each of receivers 208, 210, 212 and 214. In some embodiments, signal 376 is an encoded combination of the output signal from each of receivers 208, 210, 212 and 214. Any known method of transmitting the output signals from each of receivers 208, 210, 212 and 214 to controller 304 may be implemented, so long as controller 304 is able to distinguish which output signal corresponds to which of receivers 208, 210, 212 and 214.

Controller 304 then compares the actual output signals from each of receivers 208, 210, 212 and 214 with the corresponding expected output signals for each of receivers 208, 210, 212 and 214.

As mentioned above with reference to the external testing, method of FIG. 3A, if the actual output signal for any of receivers 208, 210, 212 and 214 does not coincide with the expected output signal within a predetermined threshold, then the receiver(s) in question is (or are) not performing correctly.

However, in the loopback testing method of FIG. 3B, if the actual output signal for any of receivers 208, 210, 212 and 214 does not coincide with the expected output signal within a predetermined threshold, then: a) the receiver(s) in question is (or are) not performing correctly; b) transmitter 216 is not performing correctly: or c) some combination of the receiver(s) in question and transmitter 216 is not performing correctly.

Further, there may be an insidious situation wherein the actual output signal for all of receivers 208, 210, 212 and 214 coincides with the expected output signal within a predetermined threshold, but device 300 is not operating correctly. For example, consider the situation where signal 374 is 5° out of the expected phase and has an amplitude that is 0.1 dB too high, whereas each of receivers 208, 210, 212 and 214 provides output signals that are −5° out of the expected phase and have an amplitude that is 0.1 dB too low. In such a situation, signal 374 from an ill performing transmitter 216 is effectively hidden by the oppositely ill performing receivers 208, 210, 212 and 214.

The loopback testing mode as discussed with respect to FIG. 3B is much faster than the external test mode discussed above with respect to FIG. 3A. However, there are problems with the loopback testing method, such as nor being able to discern whether the problem lies with a receiver or a transmitter. Further, with the loopback method, there is also the possibility that a malfunctioning transmitter is effectively hidden by an equal and oppositely malfunctioning receiver. This trade-off of speed versus accuracy between external and loopback testing methods is known. However, with a socket device in accordance with aspects of the present invention, all the transmitters in a transmitter array and all the receivers in a receiver array can easily be tested in either as loopback testing mode or an external testing mode, without making multiple connections/disconnections.

In the example embodiment discussed above with reference to FIGS. 3A-B, a single device was tested. In accordance with aspects of the present invention, a plurality of transceivers may be tested in parallel in a testing station. This will be described with additional reference to FIG. 4.

Figure 4:
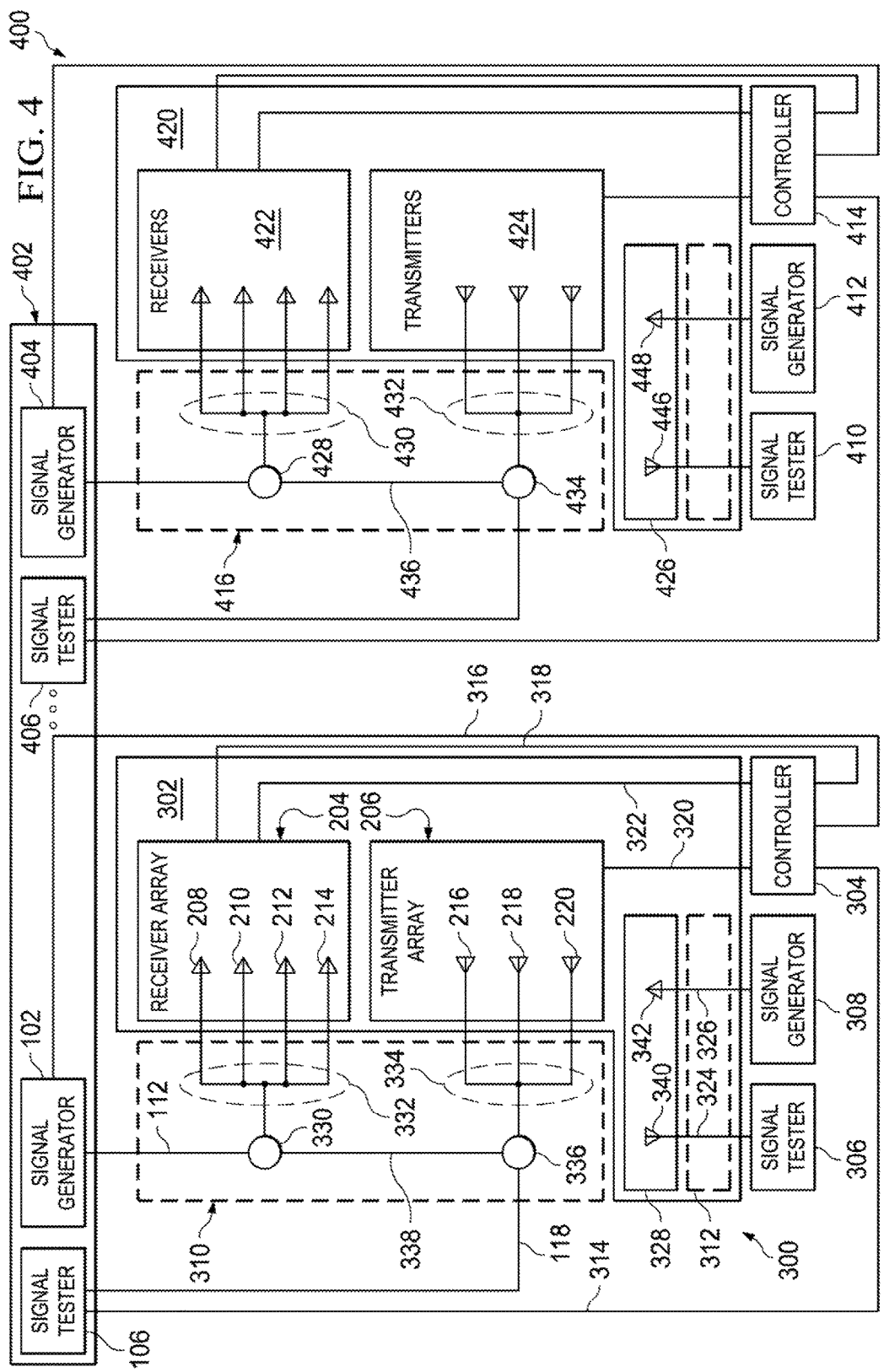
FIG. 4 illustrates a system for testing a plurality of transceivers in accordance with aspects of the present invention.

FIG. 4 illustrates a system 400 for simultaneously testing a plurality of transceivers.

As illustrated in the figure, system 400 includes a bank 402 of N signal testers and N signal generators, a sample of which are indicated as signal generator 102, signal tester 106, a signal generator 404 and a signal tester 406. N is an integer greater or equal to two, wherein any additional sets of signal tester and signal generator are indicated by the dots 408.

Further illustrated in the figure, system 400 includes controller 304, signal tester 306, signal generator 308, socket device 310, socket device 312, communication channel 112, communication channel 118, communication channel 120, a communication channel 314, communication channel 316, a communication channel 318, a communication channel 320, a communication channel 322, a communication channel 324 and a communication channel 326, all as illustrated and discussed above with reference to FIGS. 3A-B.

Still further, system 400 additionally includes a signal tester 410, a signal generator 412, a controller 414, a socket device 416 and a socket device 418.

In system 400, signal tester 106 and signal generator 102, each of bank 402, are used during the external testing of transceiver 302. Similarly, signal tester 406 and signal generator 404, each of bank 402, are used during the external testing of a transceiver 420.

Transceiver 420 includes a receiver array 422, a transmitter array 424 and a transceiver portion 426. Socket device 416 includes an input coupler 428, a power divider 430, a power combiner 432, an output coupler 434 and a loopback line 436. Transceiver portion 426 includes a transmitter 440 and a receiver 442. Transceiver 420 is similar to transceiver 302.

A signal generator 404 operates in a manner similar to signal generator 102 and signal tester 406 operates in a manner similar to signal tester 106.

For purposes of brevity, it should be noted that transceiver 420 may be tested in a manner similar to the testing of transceiver 302 as discussed above with reference to FIGS. 3A-B. System 400 represents that a plurality of transceivers may be tested simultaneously.

The present invention enables a single transmit pin and a single receive pin enabling multi-site testing, two or more devices tested in parallel whereas the external test equipment for a traditional solution will have multiple sources and multiple receivers.

As mentioned above, in a conventional transceiver having an array of receivers and an array of transmitters, each transmitter must be tested against each receiver. The conventional testing, as discussed above with reference to FIGS.

2A-E, required multiple connections/disconnections to the external test equipment. Such a method is inefficient. It is possible that a conventional device itself has multiple signal generators and multiple signal testers. In accordance with aspects of the present invention, for the same test station that will require at least four signal generators and three signal testers for a conventional tester will only need each the use of one of the signal generators and one of the signal testers to be able to measure three parallel devices.

A socket device in accordance with aspects of the present invention enables the transmitter array and the receiver array each be easily tested by way of an external testing mode or by way of a loopback mode.

A socket device in accordance with aspects of the present invention provides benefits over conventional testing systems such as, the simultaneously support of self-test and conventional RF test with limited external hardware connections. Further, due to the reduced number of external hardware connections, a testing system that implements a socket device in accordance with the present invention can support higher multi-site without additional rigid waveguide based millimeter wave components. Finally, the stability of the self-test will not be limited by re-insertions and re-connecting the socket device because the loopback path does not go through any connectors.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A socket device comprising:
   a signal generator input port adapted to receive a test transmission signal;
   an input coupler having a coupler input coupled to the signal generator input port and having an input signal output;
   a power divider having a divider input coupled to the input signal output and having plural splitter outputs, the plural splitter outputs being adapted to be coupled to receivers of a transceiver;
   a power combiner having plural inputs adapted to receive transmitted signals from transmitters of the transceiver and having a combined output;
   an output coupler having an input coupled to the combined output and having an output signal output; and
   an output port coupled to the output signal output and having a port output adapted to be coupled to a signal tester.

2. The socket device of claim 1 in which the input coupler is configured to provide a transfer function from the coupler input to the input signal output, the transfer function being one of amplitude, phase, frequency and combinations thereof.

3. The socket device of claim 1 in which the power divider is configured to equally split an input signal received on the divider input to each of the splitter outputs.

4. The socket device of claim 1 in which the power combiner is configured to combine transmitted signals received on the plural input into a combined signal on the combined output.

5. The socket device of claim 1 in which the power combiner is configured to symmetrically combine signals received at the plural inputs into a combined output signal.

6. The socket device of claim 1 in which:
   the input coupler has a loopback line output; and
   the output coupler has a loopback line input coupled to the loopback line output.

7. A method of operating a socket device comprising:
   receiving a test transmission signal at an input port of the socket device;
   receiving the test transmission signal at a test input of an input coupler and providing an input signal at an input signal output;
   receiving the input signal at a divider input coupled to the input signal output and splitting the input signal to plural splitter outputs adapted to be coupled to receivers of a transceiver;
   receiving transmitted signals at plural inputs of a power combiner adapted to receive transmitted signals from the transceiver and combining the received transmitted signals into a combined signal at a combined output;
   receiving the combined signal at an input of an output coupler and providing a measured output signal at an output of the output coupler; and
   receiving the measured output signal from the output of the output coupler at an output port.

8. The method of claim 7 in which splitting the input signal to plural splitter outputs includes splitting the input signal equally to each of the splitter outputs.

9. The method of claim 8 including providing the measured output signal from the output port to a measuring device and sequentially enabling transmitters to produce the received transmitted signals at plural inputs of the power combiner.

10. The method of claim 7 including:
   generating, via a controller, a control signal;
   generating a loopback test transmission signal, based on the control signal from a transmitter of a transmitter array;
   the receiving transmitted signals at plural inputs of a power combiner includes receiving the loopback test transmission signal;
   outputting, from the combiner, a loopback combined output signal based on the test transmission signal;
   outputting, from the output coupler to the input coupler, a loopback coupled output signal;
   outputting, from the input coupler and based on the loopback coupled output signal, a loopback input signal;
   providing, via the divider, portions of the loopback input signal to an array of receivers;
   providing, via the receiver array, a loopback received signal; and
   testing, via the controller, the loopback received signal.

* * * * *